Sept. 20, 1960 W. GORMAN 2,953,267
HAND TRUCK
Filed Feb. 3, 1960 3 Sheets-Sheet 1
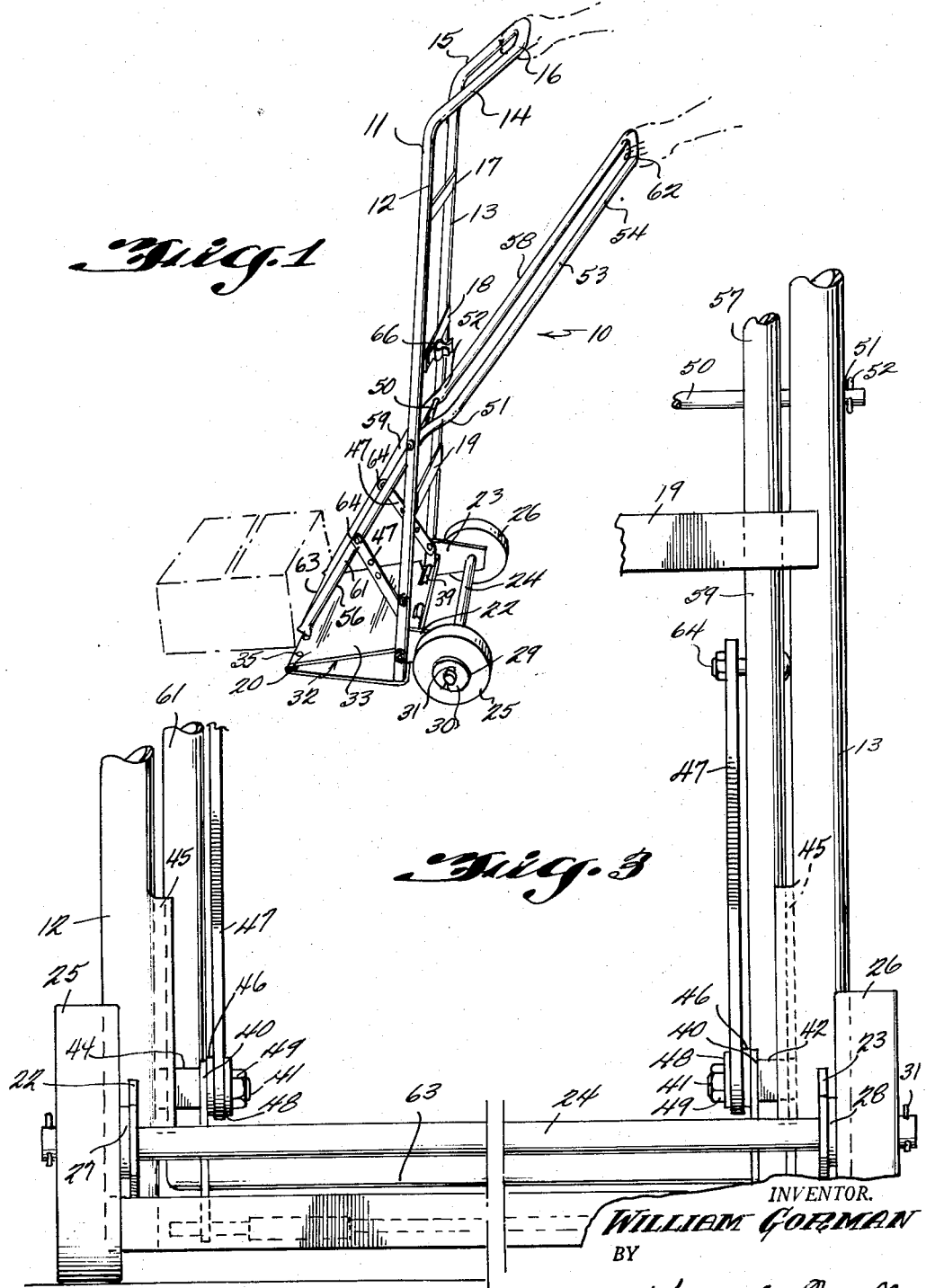
INVENTOR.
WILLIAM GORMAN
BY
Kimmel & Crowell
ATTORNEYS

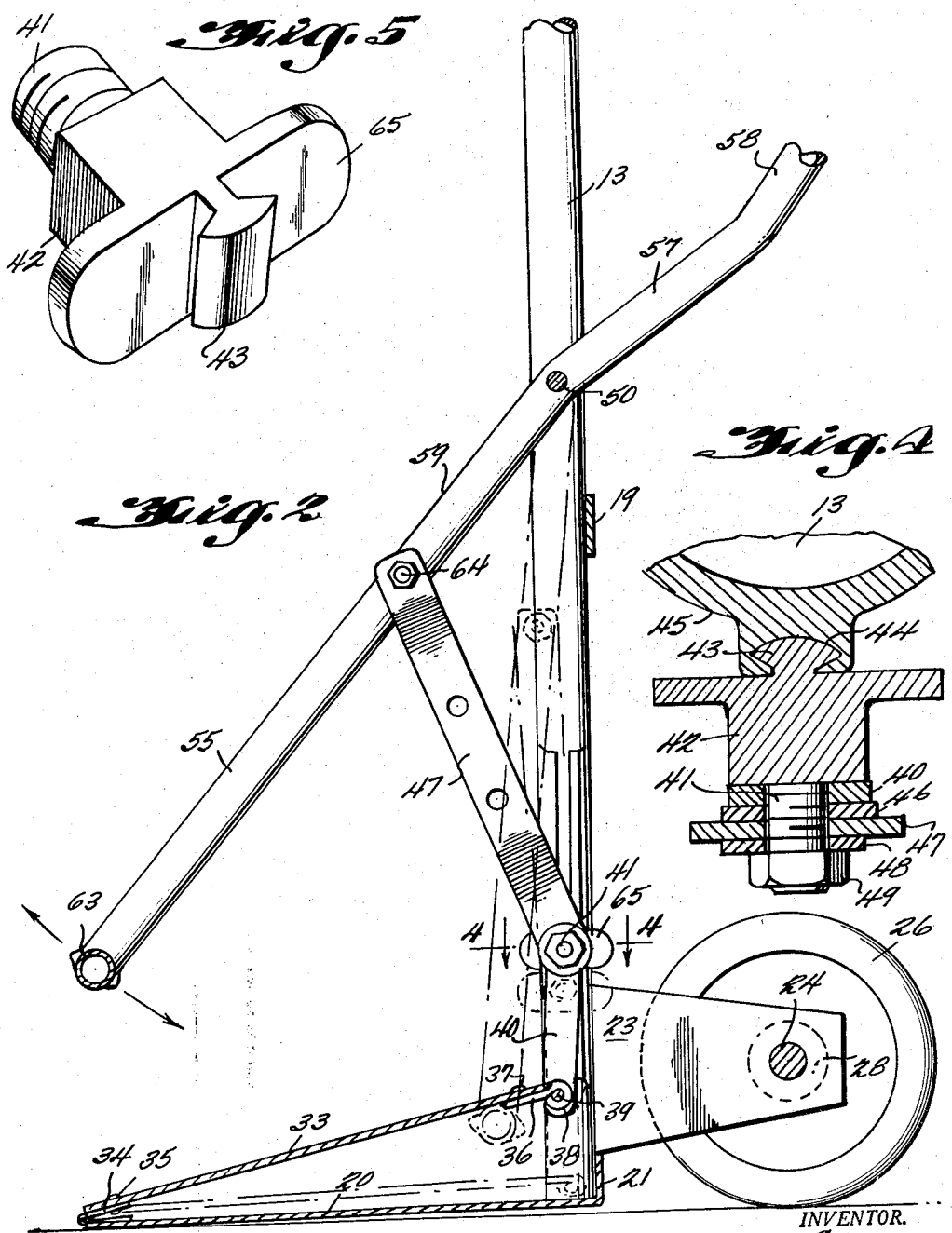

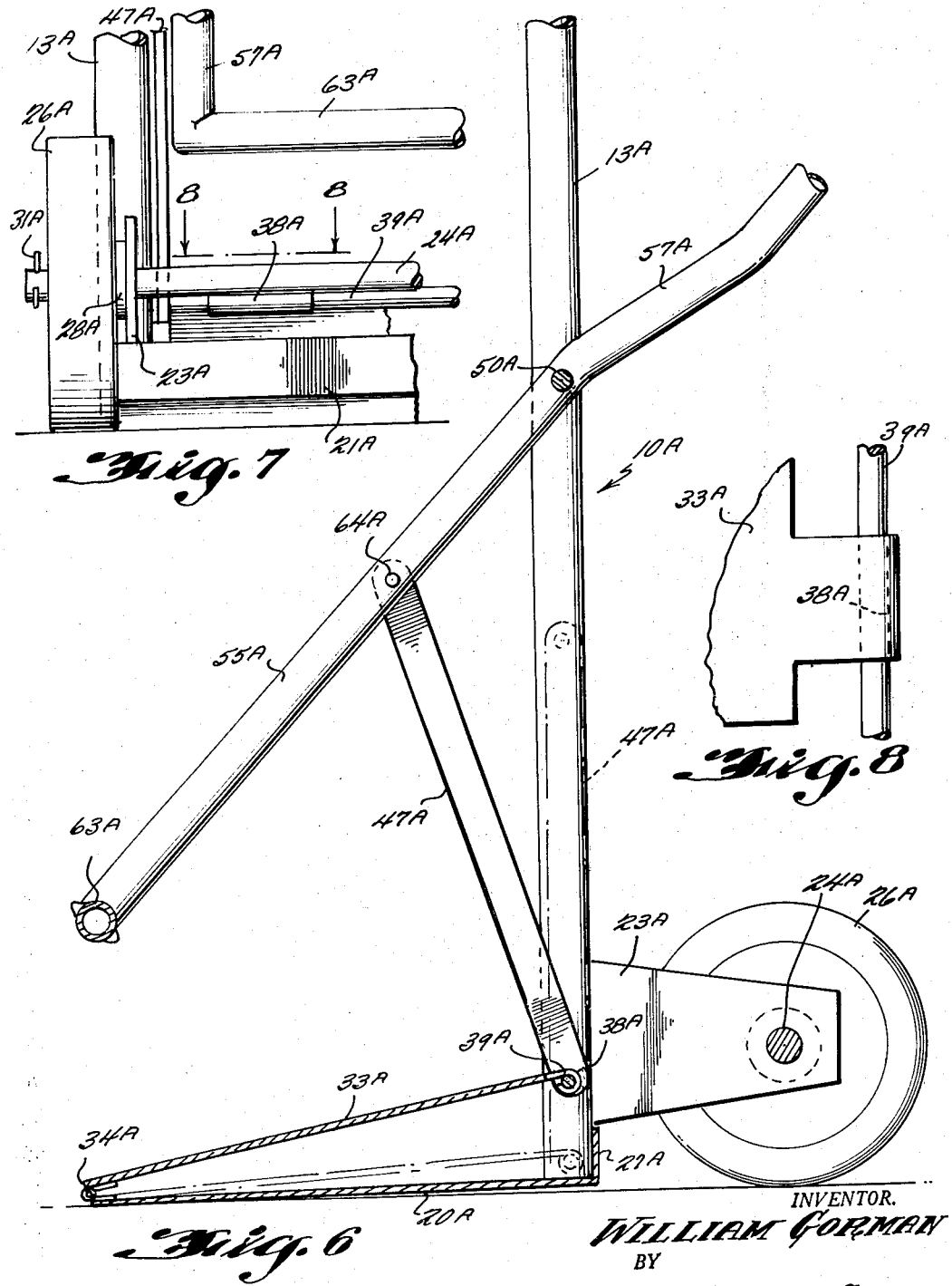

United States Patent Office 2,953,267
Patented Sept. 20, 1960

2,953,267

HAND TRUCK

William Gorman, 3123 Bancroft Road, Baltimore, Md.

Filed Feb. 3, 1960, Ser. No. 6,471

8 Claims. (Cl. 214—511)

This invention relates to improvements in hand trucks, and more particularly to the two-wheel type of hand truck that is hand pushed and is used for trucking crates, boxes, cartons, and the like. The invention relates to means for elevating articles from the base of a hand truck, and more particularly to a mechanism that will push the articles from the hand truck after the elevating mechanism has been operated.

An important object of the invention, therefore, is to provide a pushing mechanism that will assist in pushing the articles from the elevating mechanism. Thus, when the truck is moved into position the article is elevated and is then pushed from the base of a hand truck. Thus an important element of the invention is the pushing mechanism which will push the article from the base of a hand truck after the article has been elevated. Thus, the pushing mechanism will assist in unloading the article from the hand truck. Therefore, an important object of the invention is to provide a hand truck with a manually operated pushing mechanism which will eject articles from the base of the hand truck after they have been elevated.

Another important object of the invention is to provide a hand truck of this type which will permit close stacking of articles without the usual manual twisting manipulation that is necessary to stack articles with the conventional hand truck.

A further object of the invention is to provide a hand truck of this type that is simple in operation, requiring few parts for its construction, therefore, resulting in an economical manufacturing problem.

With the above and other advantages in view, this invention consists of the novel details of construction, arrangement and combinations of parts more fully hereinafter described, claimed and illustrated in the accompanying drawings, in which:

Figure 1 is a perspective view of a hand truck embodying the invention in the position that is assumed after the article has been ejected from the truck;

Figure 2 is a side elevational view of the hand truck, partly in section and partly broken away;

Figure 3 is a fragmentary rear view of the hand truck embodying the invention;

Figure 4 is an enlarged transverse sectional view on the line 4—4 of Figure 2; and Figure 5 is an enlarged perspective view of one of the slide members of the article elevating and pushing mechanism.

Figure 6 is a side elevational view partly in section and partly broken away similar to Figure 2 showing a modified form of construction;

Figure 7 is a fragmentary rear view of the structure of Figure 6; and

Figure 8 is an enlarged fragmentary plan view taken substantially along the line 8—8 of Figure 7, as viewed in the direction indicated by the arrows.

Referring more in detail to the drawings, wherein like parts are designated by like reference numerals, the reference numeral 10 is used to generally designate a hand truck embodying the invention.

The hand truck 10 comprises a generally U-shaped frame 11 which includes coplanar side members 12 and 13, at the upper ends of side members 12 and 13 there are rearwardly inclined upper end portions 14 and 15 which are joined at their free ends by a hand rail or transverse member 16. A plurality of transverse brace members 17, 18 and 19 are secured at their outer ends to the side members 12 and 13 in equally spaced parallel relation to each other to reinforce the side members 12 and 13. The U-shaped frame 11 is constructed of tubular members that possess strength, yet are light in weight so that the weight of the frame adds little to the weight of the entire hand truck 10.

The usual flat bottom of load supporting base 20 is provided for the hand truck 10 and the lower ends of the side members 12 and 13 are secured in rigid relation to the opposite ends of an upstanding longitudinally extending flange 21 that is formed integrally with the longitudinal rear edge of the base 20.

Rigidly secured to the rear surface of the lower ends of the side members 12 and 13 are a pair of rearwardly extending substantially triangular-shaped axle supporting plates 22 and 23. Mounted at its opposite ends in rigid relation to the plates 22 and 23 is a transversely extending axle 24 and ground engaging, rubber tired wheels 25 and 26 are rotatably mounted on the outer ends of the axle 24 outwardly of the plates 22 and 23. Spacing washers 27 and 28 are mounted on the axle 24 outwardly of the plates 22 and 23, so that they act as a bearing surface for the wheels 25 and 26 and wheel retaining washers 29 and 30 are positioned on the outer surface of the wheels 25 and 26 to retain the wheels in position with the aid of cotter keys 31.

The elevating and ejecting mechanism 32 comprises a bed plate 33 which is of smaller area than the base 20 of the truck and is of rectangular formation. The bed plate 33 is hinged along one longitudinal edge thereof to the forward edge of the base 20 by means of a pair of leaf hinges 34, the leaf hinges being secured to the bed plate and base plate, respectively, by means of fasteners 35.

Secured to the opposite longitudinal edge of the bed plate 33 are a pair of hinged members 36. The hinge member is secured by fasteners 37 to the bed plate 33 and has a rolled portion 38 that is oscillatably mounted on a rod 39. The rod 39 is mounted for pivotal movement at its opposite ends in link members 40. The link members 40 are pivotally mounted on a threaded stud 41 of a slide member 42 and it is to be understood that there are two slide members, one at each side of the bed plate 33. The slide member 42 has a substantially T-shaped lug member 43 thereon that is adapted to fit in a similar T-shaped track 44 of a track member 45. There is a track member 45 secured to each of the side members 12 and 13 of the hand truck 10 and the track members 45 are positioned above the elevated position of the bed plate 33.

Positioned on the studs 41 outwardly of each of the links 40 is a washer 46 and pivotally mounted on the stud 41 outwardly of the washer 46 is a link member 47. Also mounted on the stud 41 outwardly of the link member 47 is a washer 48, and a nut 49 threaded on to the stud 41 retains the previously mentioned elements in assembled relation to each other on the stud 41. A shaft 50 is mounted in the side members 12 and 13 of the hand truck 10 and the shaft 50 extends transversely of the hand truck 10 in parallel relation to the brace members 17, 18 and 19. A retaining washer 51 and a cotter key 52 positioned in the outer ends of the shaft 50 outwardly of the side members 12 and 13 retain the shaft in the side members 12 and 13.

A pushing mechanism 53 is pivotally mounted on the shaft 50 and the pushing mechanism is in the form of an elongated rectangular shaped frame 54. The frame 54 comprises side members 55 and 56 and each of the side members 55 and 56 have an arcuate bend 57 therein so that the upper portion 58 of the side member 55 lies in a different plane than the lower portion 59 thereof. The side member 56 therefore has an upper portion 60 that lies in the same plane and is parallel to the upper portion 58 of the side member 55. The lower portion 61 of the side member 56 will therefore lie in the same plane and be parallel to the lower portion 59 of the side member 55. The free ends of the upper portions 58 and 60 are bridged by a cross member or hand grip 62 and the lower ends of the lower portions 55 and 56 are bridged by a cross member or a pushing bar 63. The links 47 are at their upper ends pivotally connected to the portions 59 and 61 of the side members 55 and 56 of the frame 54 by pivot bolts 64. Thus, as the frame 54 is pivoted on the rod 50, the bed plate 53 is raised and lowered at its rear longitudinal edge by reason of the raising and lowering of the side portions 59 and 61 of the frame 54.

When it is desired to load the truck, the frame is pushed forwardly until the side member 53 of the frame 54 is engaged with and retained by a spring clip 66 that is secured to the rear surface of the brace member 18.

Returning more specifically to Figure 4, it is shown that the track member 45 is of semi-circular formation so that it is in close contact with the side member on which it is mounted. In Figure 5 it is shown that the stud 43 of the member 42 is positioned centrally of a wing portion 65.

In the operation of the hand truck 10, after a load has been deposited on the bed plate 33 and is wheeled to the desired location, the question of removing the load from the hand truck then has to be considered. In order to spot the load in a position close to a stack of similar articles with a conventional hand truck, a series of twisting movements with the conventional hand truck was required.

With the present hand truck embodying the invention, the hand truck is wheeled to the stack of articles until the load is in close contact therewith. The operator then grasps the cross member 62 and pulls it toward him. The frame 54 pivoting on the shaft 50 causes the push bar 63 to engage the load and start pushing it off of the bed plate 33. Simultaneously, the bed plate 33 is elevated by means of the links 47 and the load will, therefore, be elevated and pushed entirely off of the bed plate 33. Since the push bar 63 at its extreme outward movement lies in a plane substantially parallel with the hinged longitudinal edge of the bed plate 33, the load will be completely free of the bed plate 33 and if properly positioned will be in close contact with the other articles comprising the stack.

After the load has been deposited the hand truck may be removed after the frame 54 has been pushed forwardly until the frame engages the spring clip 66.

Figures 6, 7 and 8 disclose a modified and simplified form of the invention which is somewhat less expensive and complicated to manufacture.

The hand truck 10A of the modified form of Figure 6 includes a pair of side frame members 13A, similar to the side frame members 13, and is provided with a base 20A having an upstanding rear flange 21A. Axle supporting plates 23A carry an axle 24A upon which suitable wheels 26A, substantially identical to the wheels 26, are mounted. Washers 28A are also provided as in the foregoing modification. Cotter pins 31A serve to hold wheels 26A on axle 24A.

A bed plate 33A is hinged at its forward end by means of hinges 34A to base 20A and operates in substantially the same manner as the previously described bed plate 33. However, in this modification integral tongues 38A extend from the opposite edge of the plate 33A and are secured about a rod 39A which extends substantially across the rear portion of the bed plate, and has pivotally secured to its opposite ends the ends of links 47A. The opposite ends of links 47A are pivotally secured as at 64A by means of pivot bolts to intermediate portions of side pusher members 55A, which are connected at their lower ends by a pushing bar 63A.

Side frame members 55A are provided with arcuate bends 57A in a manner substantially identical to that of the foregoing modification, and are pivotally mounted on a rod 50A which extends transversely between the side frame members 13A.

In this modification the links 47A are mounted between the side frame members 13A and 57A so that the parts when the assembly is in inoperative position, assume the dotted line position of Figure 6 with the side members 55A disposed between and parallel to the side members 13A. By virtue of this arrangement the entire upper surface of bed plate 33A may be employed as a lifting surface for articles carried thereon.

The use and operation of this device is substantially identical to that of the foregoing modification.

The invention, therefore, contemplates a simultaneous pushing and elevating of the load so that a quick and easy unloading of the hand truck is accomplished and it is believed that from the foregoing description the structure and operation of the invention will be clear to those skilled in the art, and it is to be understood that changes in the minor details of construction, arrangement and combinations of parts, may be resorted to providing they fall within the spirit of the invention and the scope of the appended claims.

Having thus described the invention, what is claimed as new and desired to be secured by Letters Patent is:

1. The combination of a hand truck having a U-shaped frame, a base for supporting a load secured to said frame at the lower end thereof, an axle mounted on the frame rearwardly of the base, a pair of ground engaging wheels rotatably on the opposite ends of said axle, means pivotally secured to the base for elevating a load, means pivotally connected to said U-shaped frame for pushing a load from said elevating means and means connecting said pushing means to said elevating means so that movement of said pushing means will cause simultaneous operation of said elevating means.

2. The combination of claim 1 wherein a shaft is mounted in said frame and wherein the pushing mechanism comprises a rectangular shaped frame pivotally mounted on said shaft, and the elevating means comprises a bed plate pivotally mounted to said base and linkage means is provided between the pushing mechanism and the elevating mechanism to create simultaneous movement of the two.

3. A hand truck comprising, in combination, a U-shaped frame, a load carrying base secured to the lower end of said frame and extending laterally therefrom, an axle fixed to said U-shaped frame, a pair of ground engaging wheels rotatably mounted on opposite ends of said axle, a pushing mechanism including a frame pivotally mounted within said U-shaped frame, an elevating mechanism comprising a bed plate pivotally mounted on the forward longitudinal edge of said base, a pair of track members secured to said U-shaped frame in oppositely disposed relation to each other, a slide member associated with each of said track members, links connected to said slide members and to said pushing mechanism and said elevating mechanism for simultaneous operation of said pushing mechanism and said elevating mechanism.

4. A hand truck as in claim 3 wherein each of said track members has a substantially T-shaped trackway therein and each of said slide members has a substantially T-shaped lug thereon that is slidably mounted in the trackway of each of said track members.

5. A hand truck as in claim 3 wherein a first rod is mounted in said U-shaped frame and said pushing mechanism is pivotally mounted on said first rod, and a second rod is mounted in said U-shaped frame in parallel relation to said first rod, and said elevating mechanism is pivotally connected at its rear longitudinal edge of said second rod.

6. A load ejecting mechanism for a hand truck having a frame comprising a pair of coplanar side members, a load supporting base secured to the lower ends of said members, a load elevating plate pivotally mounted at its forward longitudinal edge of said load supporting base, a pushing mechanism pivotally secured to said side members intermediate thereof and links connecting said pushing mechanism and said elevating mechanism so that when said pushing mechanism is operated said elevating mechanism will be moved simultaneously with the movement of said pushing mechanism.

7. A load ejecting mechanism as in claim 6 wherein track members are secured to the inner sides of said side members and slide members are movably related to said track members and said links are pivotally connected to said slide members.

8. The combination of a hand truck having a U-shaped frame, a base for supporting a load secured to said frame at the lower end thereof a U-shaped pusher member pivotally secured at a point intermediate its length to a point intermediate the length of the legs of said first mentioned U-shaped frame, said pushing frame having a transversely extending bight forming a pushing bar, a bed plate pivotally mounted on said base adjacent the edge of said base spaced from said U-shaped frame, and side links connecting the opposite edge of said bed plate with the legs of said U-shaped pushing member for simultaneously raising said other edge of said bed plate upon pivotal movement of said U-shaped pushing member.

References Cited in the file of this patent
UNITED STATES PATENTS

| | | |
|---|---|---|
| 528,443 | Randall | Oct. 30, 1894 |
| 2,813,647 | Hauck | Nov. 19, 1957 |

FOREIGN PATENTS

| | | |
|---|---|---|
| 178,114 | Great Britain | July 13, 1922 |